(12) United States Patent
Goll

(10) Patent No.: US 12,103,220 B2
(45) Date of Patent: Oct. 1, 2024

(54) NOZZLE ALIGNMENT FIXTURE

(71) Applicant: Weiler Engineering Inc., Elgin, IL (US)

(72) Inventor: Andrew W. Goll, Huntley, IL (US)

(73) Assignee: WEILER ENGINEERING, INC., Elgin, IL (US)

( * ) Notice: Subject to any disclaimer, the term of this patent is extended or adjusted under 35 U.S.C. 154(b) by 29 days.

(21) Appl. No.: 17/705,920

(22) Filed: Mar. 28, 2022

(65) Prior Publication Data
US 2023/0302713 A1 Sep. 28, 2023

(51) Int. Cl.
B29C 49/58 (2006.01)
B29C 49/30 (2006.01)
B65B 3/02 (2006.01)
B29L 31/00 (2006.01)

(52) U.S. Cl.
CPC .............. *B29C 49/58* (2013.01); *B29C 49/30* (2013.01); *B65B 3/022* (2013.01); *B29C 2049/5837* (2013.01); *B29C 2049/5896* (2013.01); *B29L 2031/712* (2013.01)

(58) Field of Classification Search
CPC . B29C 49/58; B29C 49/30; B29C 2049/5837; B29C 2049/5896; B29C 45/17; B29C 45/1753; B65B 3/022; B29L 2031/712
See application file for complete search history.

(56) References Cited

U.S. PATENT DOCUMENTS

| 4,997,014 A * | 3/1991 | Weiler | F16K 27/029 141/237 |
| 6,589,483 B1 * | 7/2003 | Maeda | G01N 35/1065 73/863.25 |
| 2012/0126034 A1 * | 5/2012 | Nolen | B65D 83/682 239/443 |
| 2013/0341814 A1 * | 12/2013 | Witz | B29C 45/1753 425/546 |

* cited by examiner

*Primary Examiner* — Alison L Hindenlang
*Assistant Examiner* — Shibin Liang
(74) *Attorney, Agent, or Firm* — Olson & Cepuritis, Ltd.

(57) ABSTRACT

A nozzle alignment fixture suitable for use with a blow/fill/seal packaging machine in the form of an elongated block defining an aligned series of receptacles sized to receive and hold tips of fill nozzles of a blow/fill/seal packaging machine.

8 Claims, 3 Drawing Sheets

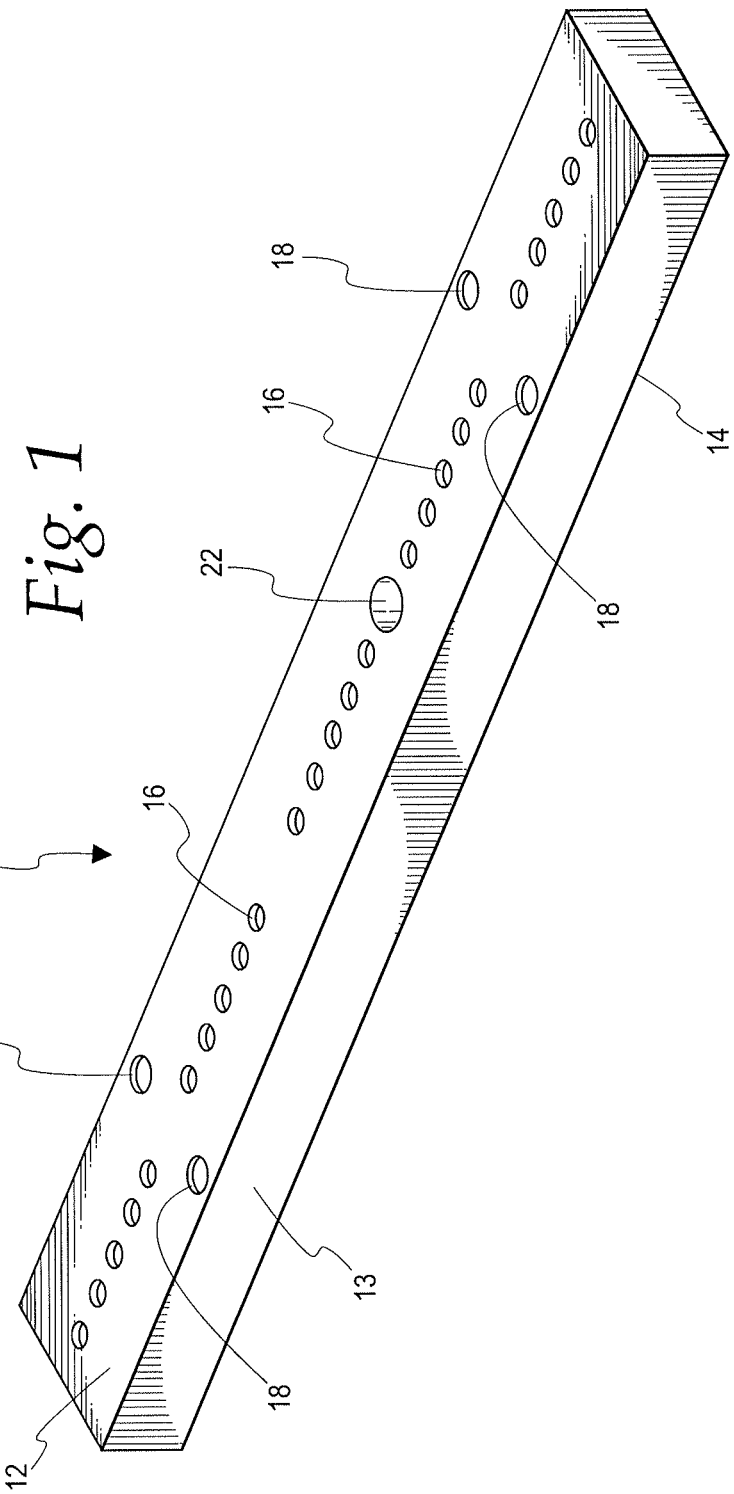

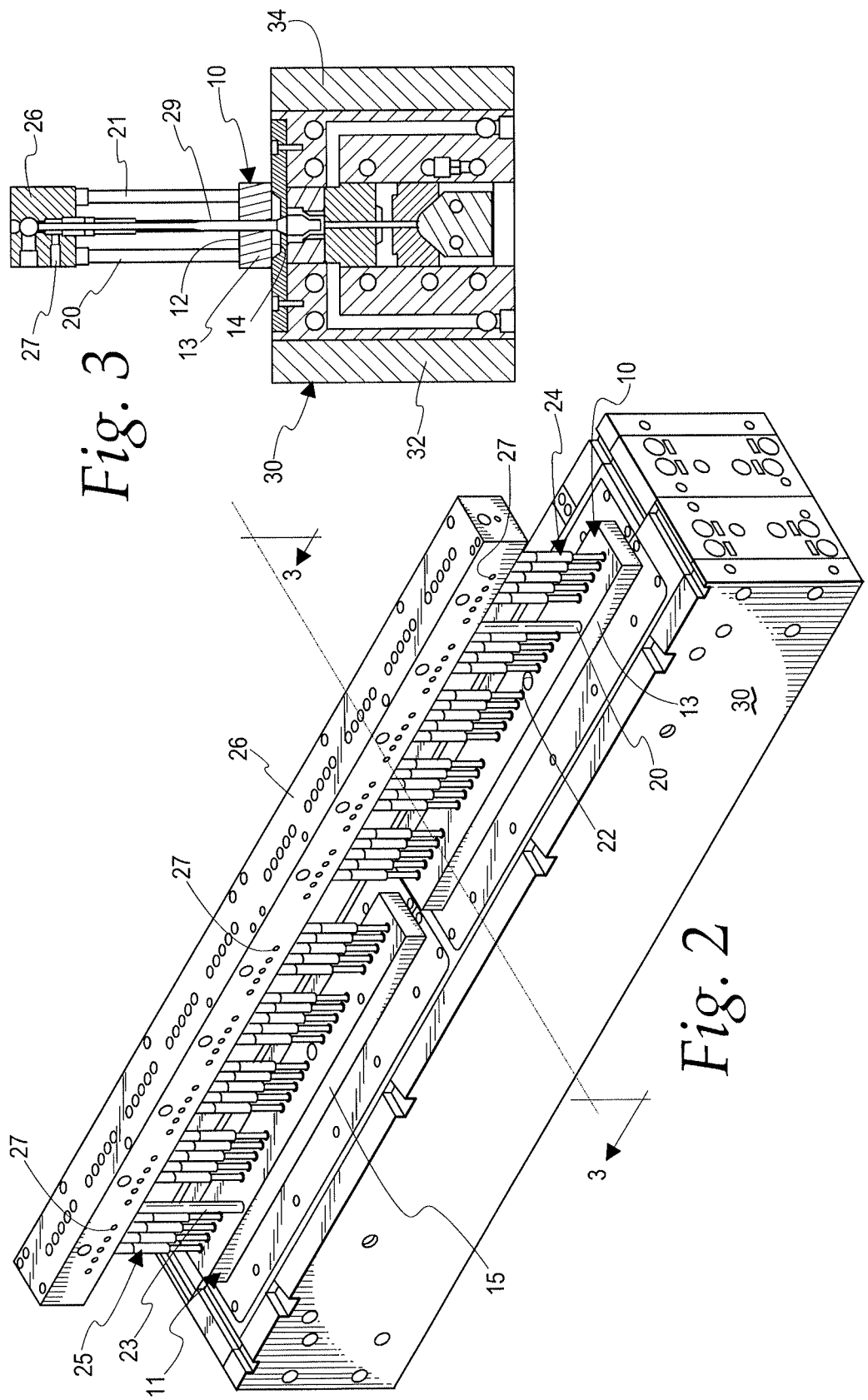

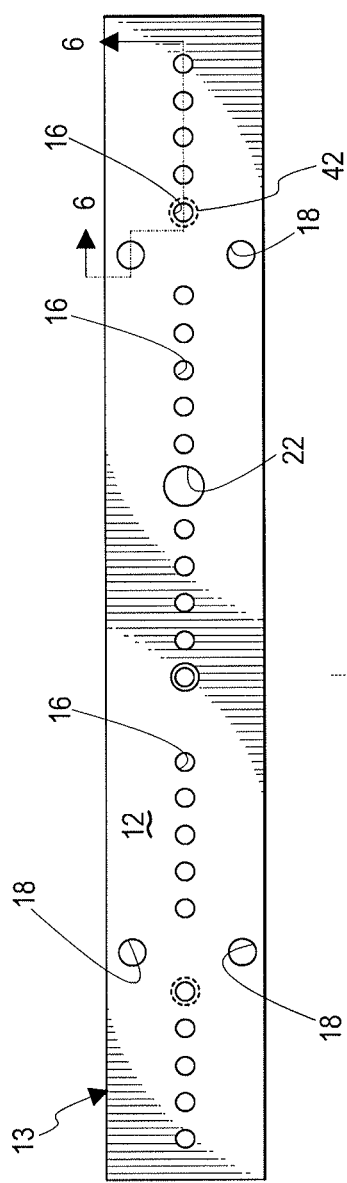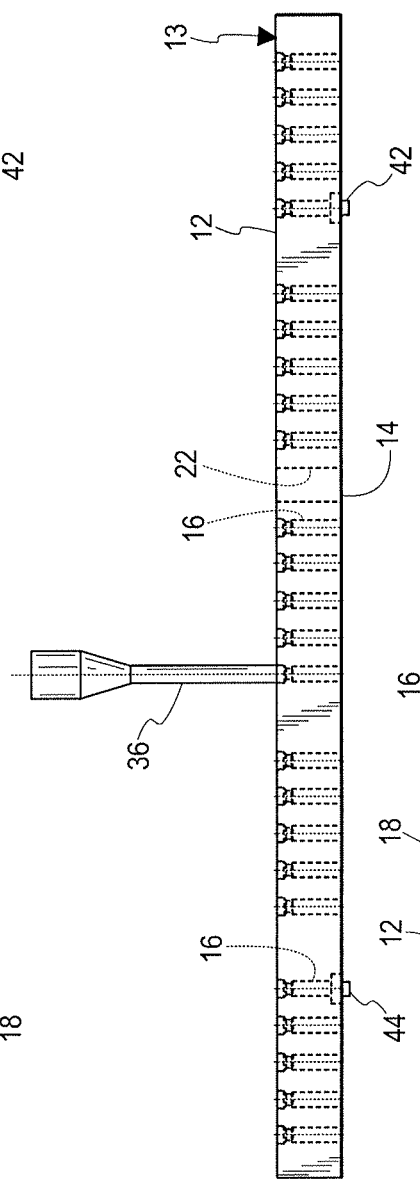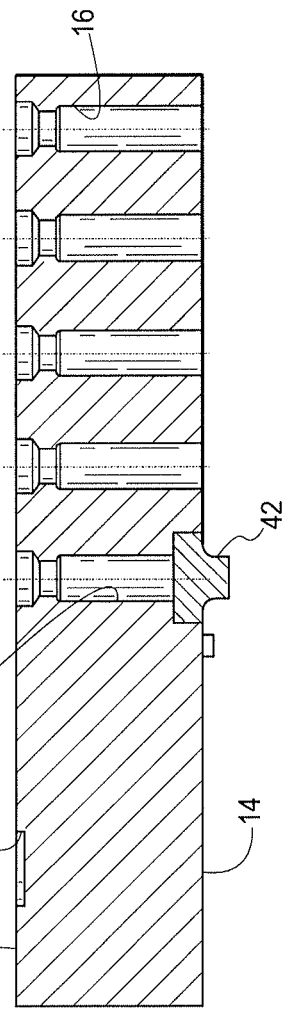

NOZZLE ALIGNMENT FIXTURE

FIELD OF INVENTION

This invention relates to blow/fill/seal packaging machines. More particularly, this invention relates to a device for aligning fill nozzles of a blow/fill/seal packaging machine.

BACKGROUND OF THE INVENTION

Blow/fill/seal (BFS) technology is a well-recognized form of aseptic processing within the pharmaceutical industry. A container is formed, filled and sealed in a continuous process in an enclosed, sterile environment within a machine. Initially, a thermoplastic resin is heat extruded to form a downwardly depending tube called a parison which is then enclosed within a two-part mold having plural cavities for containers to be formed. The parison is then cut above the mold and held within the mold. The mold containing the parison is then transferred to a filling station where filling nozzles (mandrels) are lowered and used to inflate the parison to form containers within the mold. After the containers have been formed, the nozzles are used to fill the formed containers with liquid. After the containers have been filled, the nozzles are retracted and a secondary, top mold is used to seal the filled containers. All of the foregoing manipulations take place within a sterile chamber inside the B/F/S machine.

A typical blow/fill/machine is described in U.S. Pat. No. 4,707,966 to Weiler et al. A container is formed, filled, and sealed in a continuous operation in an enclosed environment. Pharmaceutical liquid dosage forms can be aseptically manufactured in this manner provided precautions are taken to maintain an aseptic environment.

When a B/F/S machine is set up for production, the individual fill nozzles must be properly aligned with the main mold or in the B/F/S machine. While the required alignment of each fill nozzle can be effected manually, this is a time consuming task. The present invention provides a fixture that greatly facilitates the alignment of filling nozzles in a B/F/S machine.

SUMMARY OF THE INVENTION

A nozzle alignment fixture in the form of an elongated block, or plate, preferably an elongated rectangular block, has a planar top surface and an opposed planar bottom surface. The top and bottom surfaces are parallel. The elongated block defines therewithin a plurality of spaced receptacles, preferably as through passageways which extend from the top surface to the bottom surface. The receptacles are sized to receive and hold tips of nozzles, such as fill nozzles of a B/F/S machine. The elongated block also defines in the top surface at least a pair of sockets sized to receive nozzle stops of a nozzle retaining plate. At least two spaced locator prongs extend from the bottom surface, match corresponding openings in a main mold, and serve to position the elongated block on top of a main mold of a blow molding machine such as a B/F/S machine.

BRIEF DESCRIPTION OF THE DRAWINGS

In the drawings,

FIG. 1 is a perspective view of a nozzle alignment fixture embodying the present invention;

FIG. 2 is a perspective view of a fill nozzle arrangement above a main mold of a B/F/S machine, the fill nozzles being received in a pair of nozzle alignment fixtures that embody the present invention;

FIG. 3 is a sectional view taken at plane 3-3 in FIG. 2;

FIG. 4 is a top view of the nozzle alignment fixture of FIG. 1;

FIG. 5 is a side elevational view of the nozzle alignment fixture of FIG. 1 with an exemplary fill nozzle positioned for alignment; and FIG. 6 is a fragmentary sectional view of the nozzle alignment fixture of FIG. 1 taken at plane 6-6 in FIG. 4.

DETAILED DESCRIPTION OF PREFERRED EMBODIMENTS

For ease of description, a nozzle alignment fixture embodying the present invention is described hereinbelow in its usual position when in use as shown in the accompanying drawings. The terms such as top, bottom, upper, lower, and the like will be used herein with reference to this usual position. It is understood, however, that the alignment fixture may be fabricated, stored, transported, sold, or used in orientations other than those described and shown herein.

Referring to FIG. 1, alignment fixture 10 includes elongated rectangular block 13 which has a planar top surface 12 and an opposed, planar bottom surface 14. Top surface 12 and bottom surface 14 are parallel to one another. Block 13 defines a plurality of spaced receptacles 16, preferably as through passageways defined in block 13 that extend from top surface 12 to bottom surface 14. Five groupings of receptacles 16, each grouping having five receptacles, in line along the centerline of block 13, are shown in FIG. 1. Receptacles 16 are sized to receive and hold tip portions of nozzles that are to be aligned as will be discussed in greater detail hereinbelow with respect to FIGS. 2 and 3.

Two pairs of opposed sockets 18 are defined in the top surface 12 and are sized to receive nozzle stops such as nozzle stops 20 and 21 shown in FIG. 3. A pick-up hole 22 is defined in block 13 between two consecutive groups of five receptacles 16. Pick-up hole 22 is optional, but is provided to facilitate the handling of alignment fixture 10 as it is positioned on a main mold prior to use for nozzle alignment.

FIGS. 2 and 3 show alignment fixtures 10 and 11 in position above main mold 30 which is constituted by movable mold parts 32 and 34. Block 15 of alignment fixture 11 has the same configuration as block 13 of alignment fixture 10. Nozzle retaining plate 26 above main mold 30 is provided with downwardly depending nozzle groups 24 and 25. Tip portions of nozzles in nozzle group 24 are received within corresponding receptacles, defined as through passageways for ease of fabrication, in alignment fixture 10. Tips of nozzles in nozzle group 25 are received within corresponding receptacles in alignment fixture 11. Nozzle retaining plate 26 is provided with nozzle stops such as a pair of opposed nozzle stops 20 and 21 for engagement with the sockets in alignment fixture 10 and nozzle stop 23 for engagement with corresponding sockets in alignment fixture 11. Nozzle stop 23 is one of a pair of opposed nozzle stops for engagement with alignment fixture 11. The other nozzle stop of the pair of nozzle stops for engagement with alignment fixture 11 is not shown in FIG. 2.

Locking set screws 27 are provided in nozzle retaining plate 26 for each nozzle of a nozzle group and serve to lock individual nozzles of each nozzle group in a desired aligned position after the tip portions of the nozzle have been received and held within the through passageways defined in the blocks of alignment fixtures 10 and 11. After set screws 27 have been tightened, the individual nozzles are held in place in nozzle retaining plate 26, nozzle retaining plate 26 is raised, and alignment fixtures 10 and 11 removed from main mold 30.

FIG. 3 further shows alignment fixture 10 in place of main mold 30 and nozzle 29 of nozzle group 24 having a tip portion thereof received within a receptacle defined in block 13.

FIGS. 4, 5, and 6 show further details of preferred embodiments. Mold locator prongs or plugs 42 and 44 for the alignment fixture depend downwardly, extend away from bottom surface 14, and are positioned to seat in complementary sockets (not shown) provided for that purpose in the top surface of main mold 30. Preferably the mold locator plugs are in line with the through passageways provided in block 13.

As best seen in FIGS. 5 and 6, portions of receptacles 16 near top surface 12 can be contoured, if desired. The contoured portion is sized to receive and hold a nozzle tip and facilitates centering of the nozzles such as nozzle 36 in FIG. 5, relative to the corresponding receptacle.

The material of construction for the alignment fixture is a metal such as aluminum, stainless steel, and the like. A preferred material of construction is aluminum. The overall dimensions of the nozzle alignment fixture can vary depending on intended use. A typical alignment fixture embodying the invention is about 15 inches long, about 2 inches wide, and about 0.75 to 1 inch thick.

The foregoing description and the drawings are intended to be illustrative of the present invention are not to be taken as limiting. Still other variants and arrangements of individual parts within the spirit and scope of the invention are possible and will readily present themselves to those skilled in the art.

The invention claimed is:

1. A nozzle alignment fixture for a blow/fill/seal packaging machine which comprises an elongated block having a planar top surface and an opposed planar bottom surface parallel with the top surface, and defining therewithin a plurality of spaced receptacles sized to receive and hold tip portions of fill nozzles of the blow/fill/seal packaging machine, defining in the top surface thereof at least a pair of opposed sockets sized to receive nozzle stops, and having at least two spaced locator prongs extending from the bottom surface and sized to match corresponding openings in a main mold of the blow/fill/seal packaging machine.

2. The nozzle alignment fixture in accordance with claim 1 wherein the elongated block is rectangular and defines twenty-five spaced receptacles aligned relative to one another and situated along said block in five groups, each group being constituted by five receptacles.

3. The nozzle alignment fixture in accordance with claim 2 wherein a locator prong is aligned with a longitudinal axis of a receptacle in two of said groups.

4. The nozzle alignment fixture in accordance within claim 1 wherein each said receptacle is contoured to receive and hold a nozzle tip.

5. The nozzle alignment fixture in accordance with claim 1 further defining a pick-up hole in the elongated block.

6. The nozzle alignment fixture in accordance with claim 1 provided with two opposed pairs of said sockets.

7. The nozzle alignment fixture in accordance with claim 1 provided with two spaced locator prongs each aligned with one of said receptacles.

8. The nozzle alignment fixture in accordance with claim 1 wherein the elongated block is rectangular.

* * * * *